US008778829B2

(12) United States Patent
Zaidi et al.

(10) Patent No.: US 8,778,829 B2
(45) Date of Patent: Jul. 15, 2014

(54) METHANOL ELECTRO-OXIDATION CATALYST AND METHOD OF MAKING THE SAME

(75) Inventors: Syed Mohammed Javaid Zaidi, Dhahran (SA); Saleem Ur Rahman, Dhahran (SA); Shakeel Ahmed, Dhahran (SA); Mukhtar Bello, Zaria (NG)

(73) Assignee: King Fahd University of Petroleum and Minerals, Dhahran (SA)

( * ) Notice: Subject to any disclaimer, the term of this patent is extended or adjusted under 35 U.S.C. 154(b) by 283 days.

(21) Appl. No.: 13/342,930

(22) Filed: Jan. 3, 2012

(65) Prior Publication Data

US 2013/0172174 A1 Jul. 4, 2013

(51) Int. Cl.
*B01J 21/18* (2006.01)
*B01J 23/00* (2006.01)
*B01J 23/10* (2006.01)
*B01J 23/40* (2006.01)
*B01J 23/42* (2006.01)
*B01J 23/44* (2006.01)

(52) U.S. Cl.
USPC ........... 502/185; 502/182; 502/302; 502/303; 502/304; 502/339; 977/773; 977/775; 977/783

(58) Field of Classification Search
USPC ................... 502/182, 185; 977/773, 775, 783
See application file for complete search history.

(56) References Cited

U.S. PATENT DOCUMENTS

| 6,228,803 | B1 * | 5/2001 | Gadkaree et al. ............. 502/416 |
| 6,232,264 | B1 | 5/2001 | Lukehart et al. |
| 6,517,965 | B1 | 2/2003 | Gorer |
| 7,220,697 | B2 * | 5/2007 | Pak et al. ...................... 502/185 |
| 7,402,544 | B2 * | 7/2008 | Pak et al. ........................ 502/60 |
| 7,488,699 | B2 | 2/2009 | Huang et al. |
| 7,670,988 | B2 * | 3/2010 | Switzer et al. ................ 502/339 |
| 7,811,959 | B2 | 10/2010 | Lee et al. |
| 7,879,752 | B2 | 2/2011 | Sun et al. |
| 8,114,372 | B2 * | 2/2012 | Pak et al. ...................... 423/414 |

(Continued)

FOREIGN PATENT DOCUMENTS

JP 2005-267855 9/2005
KR 10-2008-0024706 3/2008

OTHER PUBLICATIONS

"Textural property tuning of ordered mesoporous carbon obtained by glycerol conversion using SBA-15 silica as template," M. Ignat et al. Carbon 48 (2010), pp. 1609-1618.*

(Continued)

*Primary Examiner* — Patricia L Hailey
(74) *Attorney, Agent, or Firm* — Richard C. Litman (57) ABSTRACT

The active methanol electro-oxidation catalysts include nano-oxides of transition metals (i.e., iron, cobalt and nickel) and platinum-ruthenium alloy nano-particles. The nano-oxides of the transition metals are dispersed during synthesis of a support material, such as mesoporous carbon. The catalyst includes a support material formed from mesoporous carbon, a nano-oxide of a transition metal dispersed in the support material, and platinum-ruthenium alloy nano-particles supported on the nano-oxide of the transition metal, the platinum-ruthenium alloy nano-particles (in a 1:1 molar ratio) forming about 15 wt % of the methanol electro-oxidation catalyst, the transition metals forming about 15 wt % of the methanol electro-oxidation catalyst, and carbon and oxygen forming the balance of about 70 wt % of the methanol electro-oxidation catalyst.

11 Claims, 6 Drawing Sheets

SBA-15

Fe$_2$O$_3$/SBA-15

CoO/SBA-15

NiO/SBA-15

(56) References Cited

U.S. PATENT DOCUMENTS

| | | |
|---|---|---|
| 2009/0042089 A1* | 2/2009 | Choi et al. ............ 429/40 |
| 2009/0098442 A1 | 4/2009 | Pak et al. |
| 2009/0208751 A1 | 8/2009 | Green et al. |
| 2011/0091787 A1 | 4/2011 | McGrath et al. |
| 2011/0114075 A1 | 5/2011 | Mills |
| 2011/0281027 A1* | 11/2011 | Vogt ............ 427/226 |
| 2012/0196745 A1* | 8/2012 | Pak et al. ............ 502/439 |

OTHER PUBLICATIONS

"Preparation and electrocatalytic application of high dispersed Pt nanoparticles/ordered mesoporous carbon composites," Yufan Zhang et al. Electrochimica Acta 56 (2011), pp. 5849-5854.*

"The effect of the use of lanthanum-doped mesoporous SBA-15 on the performance of Pt/SBA-15 and Pd/SBA-15 catalysts for total oxidation of toluene," K. Bendahou et al. Applied Catalysis A: General 351 (2008), pp. 82-87.*

Zhen-Bo Wang, Chun-Rong Zhao, Peng-Fei Shi, Yu-Sheng Yang, Zhong-Bao Yu, Wei-Kun Wang, Ge-Ping Yin, "Effect of a Carbon Support Containing Large Mesopores on the Performance of a Pt-Ru-Ni/C Catalyst for Direct Methanol Fuel Cells", *J. Phys. Chem. C.* 2010, 114 (1), pp. 672-677.

Min Ku Jeon, Ki Rak Lee, Hideo Daimon, Akemi Nakahara and Seong Ihl Woo, "Pt45Ru45M10/C (M=Fe, Co, and Ni) Catalysts for Methanol Electro-oxidation", Catalysis Today, vol. 132, Issues 1-4, Mar. 31, 2008, pp. 123-126, 11th Korea-Japan Symposium on Catalysis, May 21-23, 2007, Seoul, Korea.

Jung-Nyun Nam et al., "Direct methanol fuel cell Pt-carbon catalysts by using SBA-15 nanoporous templates", Electrochemistry Communications 6 (2004), pp. 737-741.

* cited by examiner

SBA-15

$Fe_2O_3$/SBA-15

CoO/SBA-15

NiO/SBA-15

METHANOL ELECTRO-OXIDATION CATALYST AND METHOD OF MAKING THE SAME

BACKGROUND OF THE INVENTION

1. Field of the Invention

The present invention relates to electro-oxidation catalysts, and particularly to methanol electro-oxidation catalysts including transition metal oxides and mesoporous carbon, and a method of making the same.

2. Description of the Related Art

The electro-catalysis of methanol oxidation is among the most significant challenges limiting large-scale commercialization of direct methanol fuel cells. In the anode of the direct methanol fuel cell, methanol is directly supplied as a fuel. During methanol electro-oxidation, methanol is oxidized to produce carbon dioxide, electrons, and protons:

(1)

(2)

(3)

Among all of the metals, platinum (Pt) is believed to be the most active for the electro-oxidation of methanol in an acid environment. In general, for both the cathode catalyst and the anode catalyst, Pt or an alloy containing Pt as a main constituent element is used. However, Pt is very expensive, and during the methanol electro-oxidation reaction, intermediate carbon monoxide is produced, which is strongly adsorbed on the Pt surface. The adsorption of carbon monoxide as an intermediate material in the reaction on the surface of the Pt catalyst deteriorates its catalytic activity, which negatively affects the performance of the direct methanol fuel cell. Thus, in order to realize the success of direct methanol fuel cell technology, new methanol electro-oxidation catalysts having lower percentages of platinum would be desirable.

A number of binary and ternary catalysts for methanol electro-oxidation are known. Most of these catalysts are based on modification of Pt with some other metal(s). Among the various catalyst formulations, Pt—Ru alloys have shown the best results for the methanol electro-oxidation. Following a bi-functional mechanism, the Ru—OH species act as a source of atomic oxygen, which is required for the electro-oxidation of the adsorbed carbon monoxide to carbon dioxide, thus liberating active sites on the surface of the catalyst material near a Pt atom. The reaction steps are described using a hi-functional mechanism as follows:

(4)

(5)

However, the use of the noble metals, such as Pt and Ru, contributes to the high cost of the methanol electro-oxidation catalysts, which affects the overall cost of the direct methanol fuel cell. Thus, development of active methanol electro-oxidation catalysts with lower amounts of both Pt and Ru is desired.

Thus, a methanol electro-oxidation catalyst and method of making the same solving the aforementioned problems is desired.

SUMMARY OF THE INVENTION

The present invention relates to methanol electro-oxidation catalysts and a method for preparing active methanol electro-oxidation catalysts. The methanol electro-oxidation catalysts described herein contain less platinum and ruthenium than is normally required for reasonable activity in conventional methanol electro-oxidation catalysts. The active methanol electro-oxidation catalysts include nano-oxides of transition metals (i.e., iron, cobalt and nickel) and platinum-ruthenium alloy nano-particles. The nano-oxides of the transition metals are dispersed during synthesis of a support material, preferably formed from mesoporous carbon.

The catalyst includes a support material formed from mesoporous carbon, a nano-oxide of a transition metal dispersed in the support material, and platinum-ruthenium alloy nano-particles supported on the nano-oxide of the transition metal. The platinum-ruthenium alloy nano-particles (in a 1:1 molar ratio) form about 15 wt % of the methanol electro-oxidation catalyst, the transition metals form about 15 wt % of the methanol electro-oxidation catalyst, and carbon and oxygen form the balance of about 70 wt % of the methanol electro-oxidation catalyst.

In order to prepare the catalyst, SBA-15 mesoporous silica is first added to a 0.5M transition metal nitrate solution in ethanol to form an intermediate solution. The intermediate solution is then evaporated to obtain a dry powder. The dry powder is oxidized to form a composition of an oxide of a transition metal and SBA-15 mesoporous silica.

A sucrose and sulfuric acid solution is then added to the composition to form a slurry. The slurry is dried to form a secondary dry powder. The secondary dry powder is then carbonized to form a composition of an oxide of a transition metal and mesoporous carbon. NaBH$_4$ reduction is then performed on the composition of an oxide of a transition metal and mesoporous carbon and platinum and ruthenium precursors are added to form a secondary slurry. The secondary slurry is then dried to form the methanol electro-oxidation catalyst.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present active methanol electro-oxidation catalysts include nano-oxides of transition metals (i.e., iron, cobalt and nickel) and platinum-ruthenium nanoparticles. The nano-oxides of the transition metals are dispersed during synthesis of a support material, preferably formed from mesoporous carbon (MC). The platinum-ruthenium nano-particles (in a 1:1 molar ratio) form about 15 wt % of the methanol electro-oxidation catalyst, the transition metals form about 15 wt % of the methanol electro-oxidation catalyst, and carbon and oxygen form the balance of about 70 wt % of the methanol electro-oxidation catalyst.

SBA-15 mesoporous silica is used as a template for preparing the mesoporous carbon (MC) incorporated with the nano-oxides of the transition metals, although it should be understood that other suitable materials may be substituted as the template. Initially, SBA-15 was synthesized by dispersing 4 g of poly (ethylene glycol)-block-poly (propylene glycol)-block poly (ethylene glycol) (EO$_{20}$PO$_{70}$EO$_{20}$), a tri-block copolymer sold under the tradename Pluronic P-123, manufactured by BASF SE, into 30 g of distilled water, and stirred for 4 hours at room temperature. The Pluronic P-123 serves as a structure-directing agent. Then, 120 mL of 2M hydrochloric acid (HCl) solution was added and stirred at 40° C. for 2 hours. This was followed by the addition of 9 g of tetraethylorthosilicate and continuous stirring for 24 hours at 40° C. The resulting gel was aged at 130° C., after which it was filtered, washed with deionized water several times, and dried in an oven at 100° C. overnight. Finally, the powder was calcined at 540° C. for 24 hours to obtain the SBA-15.

For the preparation of Fe$_2$O$_3$-SBA-15, CoO-SBA-15 and NiO-SBA-15, a required amount of the prepared SBA-15 in ethanol was added to 0.5M of iron (III) nitrate enneahydrate solution in ethanol, 0.5M cobalt (II) nitrate hexahydrate solution in ethanol, and 0.5M nickel (II) nitrate hexahydrate solution in ethanol, respectively. The solutions were stirred for 24 hours at room temperature and then evaporated to obtain dry powders. This was then followed by oxidation at 300° C. for 3 hours under an oxygen atmosphere to obtain the Fe$_2$O$_3$-SBA-15, CoO-SBA-15 and NiO-SBA-15.

Figure 1:
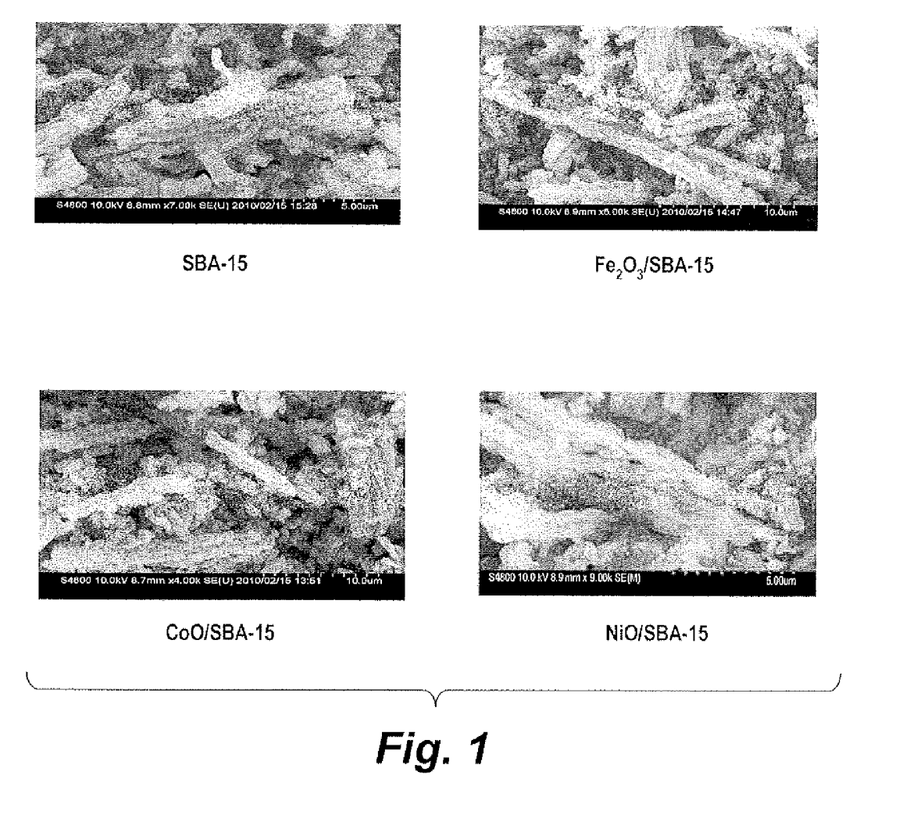
FIG. 1 shows field emission scanning electron microscope (FESEM) images for SBA-15, Fe$_2$O$_3$/SBA-15, CoO/SBA-15 and NiO/SBA-15 samples prepared by the method of making methanol electro-oxidation catalysts according to the present invention.

As shown in FIG. 1, field emission scanning electron microscope (FESEM) images were obtained for the SBA-15, Fe$_2$O$_3$/SBA-15, CoO/SBA-15, and NiO/SBA-15 samples. It can be seen that the Fe$_2$O$_3$/SBA15, CoO/SBA15, and NiO/SBA-15 samples have similar rope-like morphology, similar to that of the host mesoporous silica template (SBA-15). This indicates that the incorporation of Fe$_2$O$_3$, CoO, and NiO has not distorted the structure of the host SBA-15. It can be further seen that numerous strip-like structures with relatively uniform sizes are aggregated into the rope-like macrostructures, which may enhance the overall stability of the samples.

Figure 2:
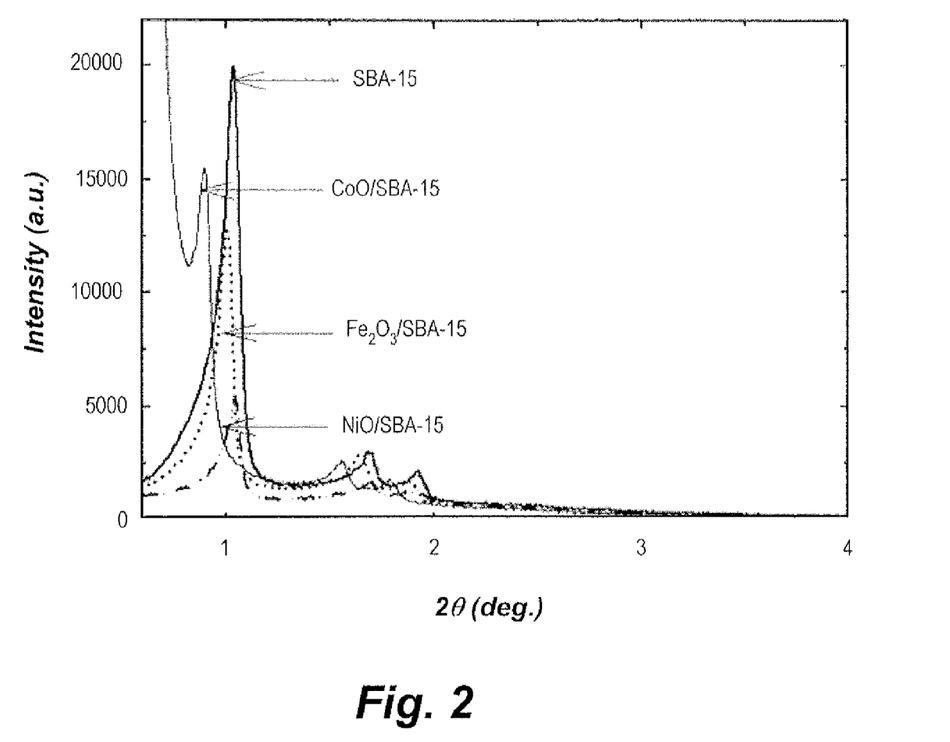
FIG. 2 is a graph showing low angle x-ray diffraction (XRD) intensity as a function of angle for SBA-15, Fe$_2$O$_3$/SBA-15, CoO/SBA-15 and NiO/SBA-15 samples prepared by the method of making methanol electro-oxidation catalysts according to the present invention.

Low angle powder x-ray diffraction (XRD) patterns for the SBA-15, Fe$_2$O$_3$/SBA-15, CoO/SBA-15, and NiO/SBA-15 samples are shown in FIG. 2. The obtained XRD patterns for the Fe$_2$O$_3$/SBA-15, CoO/SBA-15 and NiO/SBA-15 samples are quite similar to that of the host SBA-15 sample, which further shows that the framework structure of the SBA-15 is successfully maintained. This result is consistent with the FESEM observation.

The XRD patterns for all of the samples show three well-resolved diffraction peaks for the 2θ (deg) angle near 1.0, 1.6, and 1.9, which are typical characteristics of hexagonally-arranged mesoporous materials. However, a shift towards the lower angle is observed for the CoO/SBA-15 sample, which suggests less alloying than in the other samples.

Figure 3:
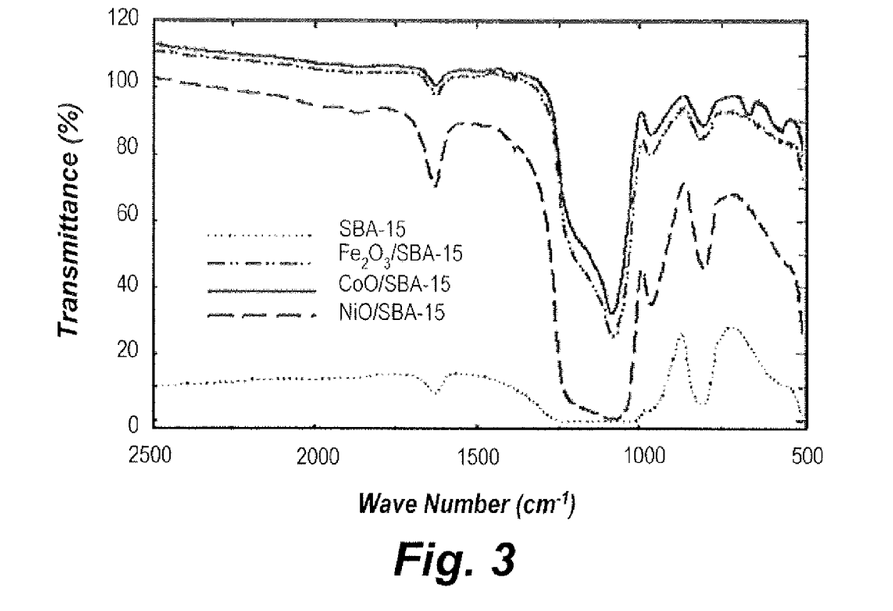
FIG. 3 is a graph showing Fourier transform/infrared (FT-IR) spectra for the SBA-15, Fe$_2$O$_3$/SBA-15, CoO/SBA-15 and NiO/SBA-15 samples of FIGS. 1 and 2.

The Fourier transform/infrared (FT-IR) spectra for the SBA-15, Fe$_2$O$_3$/SBA-15, CoO/SBA-15, and NiO/SBA-15 samples are shown in FIG. 3. The broad absorption band observed between 1000-1250 cm$^{-1}$ is attributed to the presence of silica. It can be seen that this absorption band is widest for the host SBA-15, followed by the NiO/SBA-15 sample, which confirms better alloying in the NiO/SBA-15, as also shown by the FESEM images and low angle powder XRD patterns. A sharper peak near 950 cm$^{-1}$ is observed for all the samples compared to the host SBA-15, which suggests the presence of more oxygen in the oxides samples.

Figure 4A:
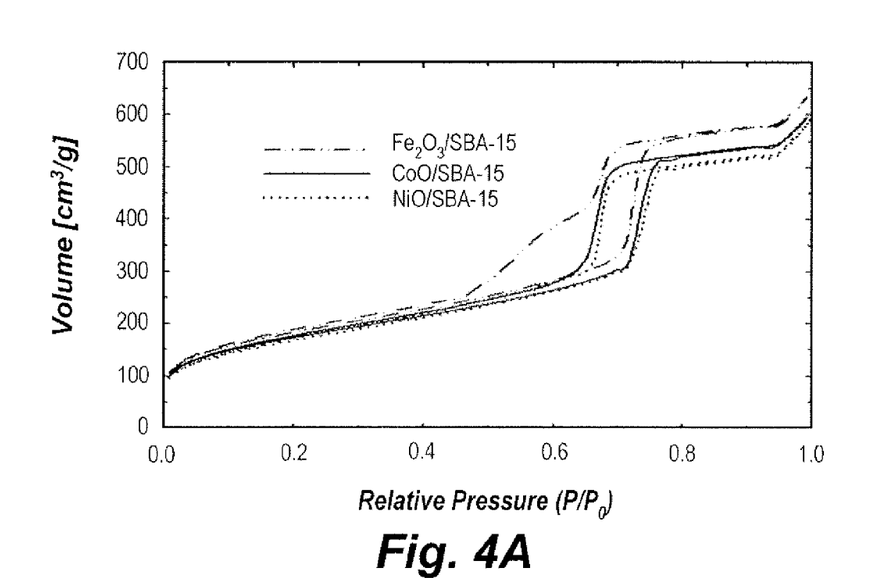
FIG. 4A is a graph showing the specific surface area of the Fe$_2$O$_3$/SBA-15, CoO/SBA-15 and NiO/SBA-15 samples of FIGS. 1 and 2.
Figure 4B:
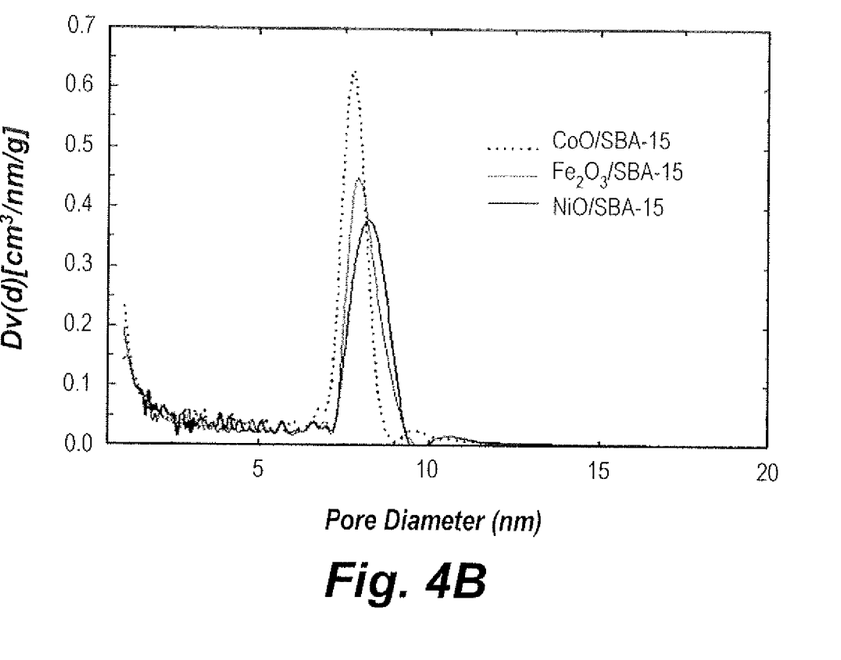
FIG. 4B is a graph showing the porosity of the Fe$_2$O$_3$/SBA-15, CoO/SBA-15 and NiO/SBA-15 samples of FIGS. 1 and 2.

The specific surface area and porosity of the Fe$_2$O$_3$/SBA-15, CoO/SBA-15 and NiO/SBA-15 samples were measured by N$_2$ physisorption, and the results are shown in FIGS. 4A and 4B, respectively, and Table 1 below. In FIG. 4A, all of the isotherms for the samples show a typical Type 1V model (according to the IUPAC classification) and have a H1 hysteresis loop at the high pressure side, which is representative of mesopores. The shape of the N$_2$ adsorption-desorption isotherms further confirms that a well-ordered mesoporous structure similar to that of the host SBA-15 was obtained for all of the samples.

The sharp inflections between the relative pressures (P/P$_0$) 0.5-0.8 in the isotherms correspond to capillary condensation within the uniform mesopores. The textural parameters, such as the specific surface area, pore volume and pore diameters, are given in Table 1 below. Pore size distribution derived from desorption branch of the N$_2$ hysteresis for the samples is shown in FIG. 4B. The Barrett-Joyner-Halenda (BJH) method was used to analyze the desorption branch of the isotherms at relative high pressure, as is well known, to obtain the pore size distribution of the Fe$_2$O$_3$/SBA-15, CoO/SBA-15 and NiO/SBA-15 samples.

TABLE 1

Pore Structure Properties of Transition Metal Nano-oxides in SBA-15

| Sample | BET Surface Area (m$^2$/g) | Total Pore Volume (cm$^3$/g) | Average Pore Diameter (nm) |
|---|---|---|---|
| Fe$_2$O$_3$-SBA-T5 | 621 | 0.84 | 5.42 |
| CoO-SBA-15 | 661 | 0.91 | 5.38 |
| NiO-SBA-35 | 606 | 0.81 | 5.50 |

For the preparation of Fe$_2$O$_3$-MC, CoO-MC, and NiO-MC, 1.25 g of sucrose, 5 g of water and 0.14 g of H$_2$SO$_4$ were mixed together to obtain a solution, which was added dropwise to 1 g of Fe$_2$O$_3$/SBA-15, CoO/SBA-15 and NiO/SBA-15 each. The slurries were dried at 160° C. in an oven and then crushed to obtain fine dry powders. The obtained dried powders were dissolved in a mixture of 0.83 g of sucrose, 5 g of water and 0.093 g of sulfuric acid. The slurries were again dried at 160° C. in an oven and then crushed to obtain fine dry powders. The dried powders were then carbonized at 900° C., treated with hydrofluoric acid solution, filtered, and washed three times with ethanol. The samples were then dried at 160° C. in an oven for 8 hours to obtain the $Fe_2O_3$-MC, CoO-MC, and NiO-MC samples.

Figure 5A:
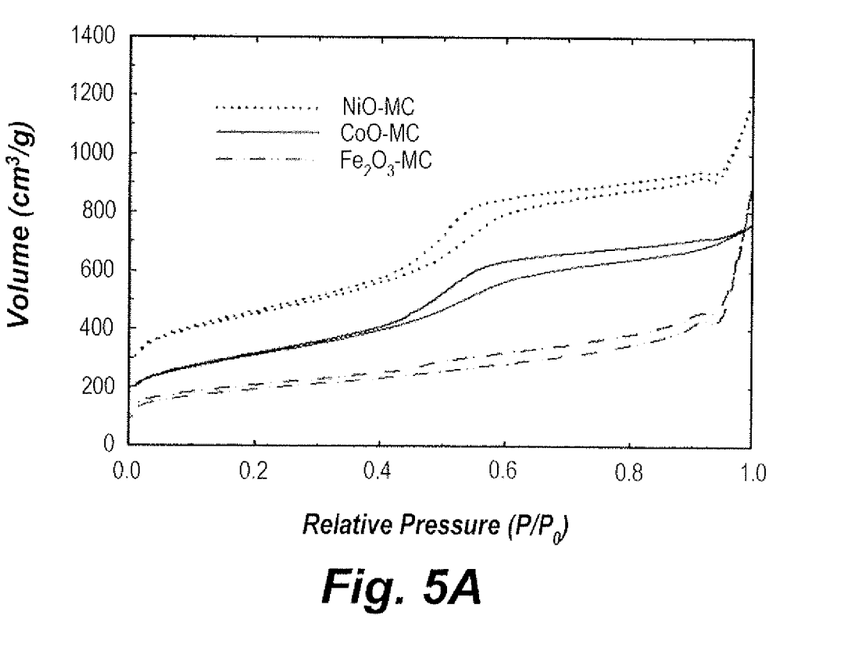
FIG. 5A is a graph showing specific surface area of Fe$_2$O$_3$-MC, CoO-MC and NiO-MC samples prepared by the method of making methanol electro-oxidation catalysts according to the present invention.
Figure 5B:
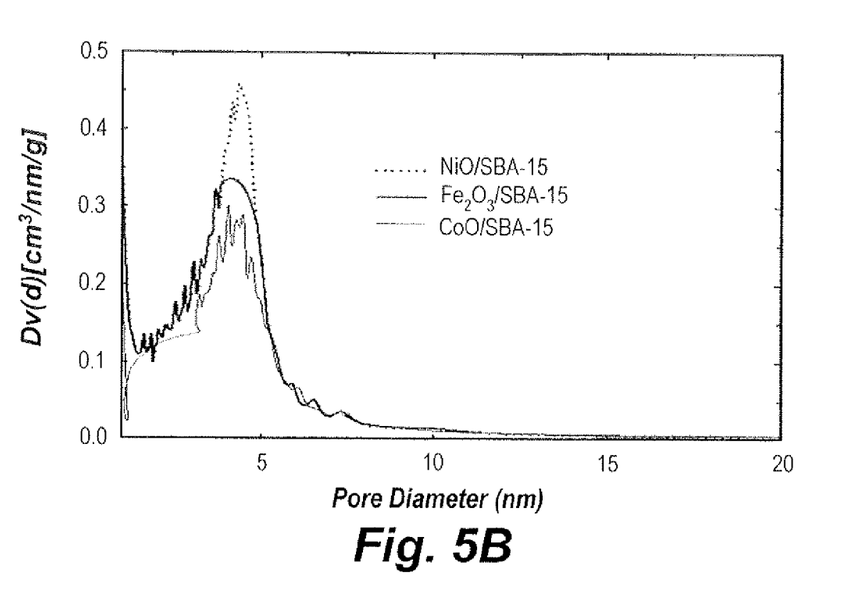
FIG. 5B is a graph showing porosity of the Fe$_2$O$_3$-MC, CoO-MC and NiO-MC samples of FIG. 5A.

The specific surface area and porosity of the $Fe_2O_3$-MC, CoO-MC and NiO-MC samples were measured by $N_2$ physisorption and the results are shown in FIGS. 5A and 5B, respectively, and Table 2 below. In FIG. 5A, all of the isotherms for the samples show a typical Type 1V model. Pore size distribution derived from the desorption branch of the $N_2$ hysteresis for the samples is shown in FIG. 5B. The BJH method was used to analyze the desorption branch of the isotherms at relative high pressure to obtain the pore size distribution of the $Fe_2O_3$-MC, CoO-MC and NiO-MC samples.

The textural parameters, including specific surface area, pore volume and pore diameters are given below in Table 2. It can be seen that in all of the samples that there is an increase in surface area compared to the parent samples; i.e., the $Fe_2O_3$/SBA-15, CoO/SBA-15 and NiO/SBA-15 samples. However, significant increase in surface area and pore volume is observed for the CoO-MC and NiO-MC samples, while a decrease in pore volume was observed for the $Fe_2O_3$-MC sample. This indicates a possible length shortening for the $Fe_2O_3$-MC sample.

TABLE 2

Pore Structure Properties of Transition Metal Nano-oxides in Mesoporous Carbon

| Sample | BET Surface Area ($m^2$/g) | Total Pore Volume ($cm^3$/g) | Average Pore Diameter (nm) |
|---|---|---|---|
| $Fe_2O_3$-MC | 621 | 0.84 | 5.42 |
| CoO-MC | 661 | 0.91 | 5.38 |
| NiO-MC | 606 | 0.81 | 5.50 |

The catalyst samples were prepared using conventional $NaBH_4$ reduction by dispersing $Fe_2O_3$-MC, CoO-MC, and NiO-MC in deionized water, followed by ultrasonication. Then, 100 mg of $NaBH_4$ in 5 mL deionized water was added immediately. This was followed by rapid addition of the Pt and Ru precursors, hydrogen hexachloroplatinate (IV) hexahydrate ($H_2PtCl_6$ $6H_2O$), and ruthenium (III) nitrosyl nitrate solution ($Ru(NO)(NO_3)_x(OH)_y$). The slurries were stirred for 24 hours at room temperature, filtered, washed with deionized water, and then dried in a vacuum oven at 100° C. for 6 hours to obtain the Pt—Ru/$Fe_2O_3$-MC, Pt—Ru/CoO-MC and Pt—Ru/NiO-MC catalyst samples. The overall proportion of metals (Pt, Ru, Fe, Co and Ni) in the prepared catalyst samples was about 30 wt %.

Figure 6:
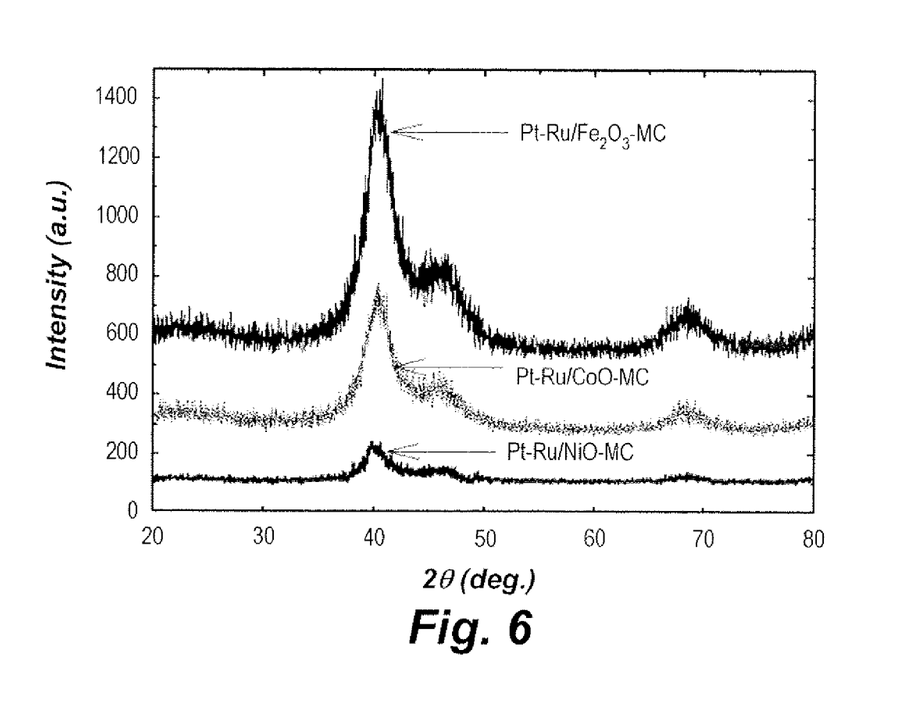
FIG. 6 is a graph showing high angle x-ray diffraction intensity as a function of angle for the Pt—Ru/Fe$_2$O$_3$-MC, Pt—Ru/CoO-MC and Pt—Ru/NiO-MC samples prepared by the method of making methanol electro-oxidation catalysts according to the present invention.

As shown in FIG. 6, high angle powder XRD patterns were obtained for the prepared catalyst samples. In all of the samples, the presence of the face-centered cubic (FCC) structure typical of platinum metal could be inferred from the strong diffractions represented by the crystalline planes (111), (200) and (220), near 2θ of 40.0°, 46.0° and 68.5°, respectively. Peaks associated with metallic Ru were not observed in all of the samples.

If the reflection intensities of the Ru metal are low compared with those of the Pt and/or the Ru is present as an amorphous compound, it will not be detected in the diffractograms. However, it is suggested that Ru promotes the dispersion of the electro-catalyst; the unalloyed amorphous material that may reside on or near the surface of the Pt—Ru alloy particles may help prevent sintering during the deposition or during the thermal reduction processes.

To determine the Pt—Ru crystal size, the (220) reflection was used because, even though it is not the strongest, it is completely outside the region of the broad band produced by the carbon support, thus there is no overlap. The Pt—Ru crystal size and lattice parameter for the prepared catalyst samples are given below in Table 3. From Table 3, it can be seen that Pt—Ru/NiO-MC showed a Pt—Ru crystal size of 1.4 nm and the highest lattice parameter of 3.8962 Å. Appropriate lattice parameter value is beneficial for improving catalyst performance, since close inter-particles distance and scattering of the particles decrease catalyst performance.

TABLE 3

XRD Daa Analysis for Prepared Catalyst Samples

| Catalyst Sample | Crystal Size (nm) | $d_{hkl}$ (Å) | Lattice Parameter (Å) |
|---|---|---|---|
| Pt—Ru/$Fe_2O_3$-MC | 1.5 | 1.3722 | 3.8812 |
| Pt—Ru/CoO-MC | 1.4 | 1.3739 | 3.8860 |
| Pt—Ru/NiO-MC | 1.4 | 1.3775 | 3.8962 |

Figure 7:
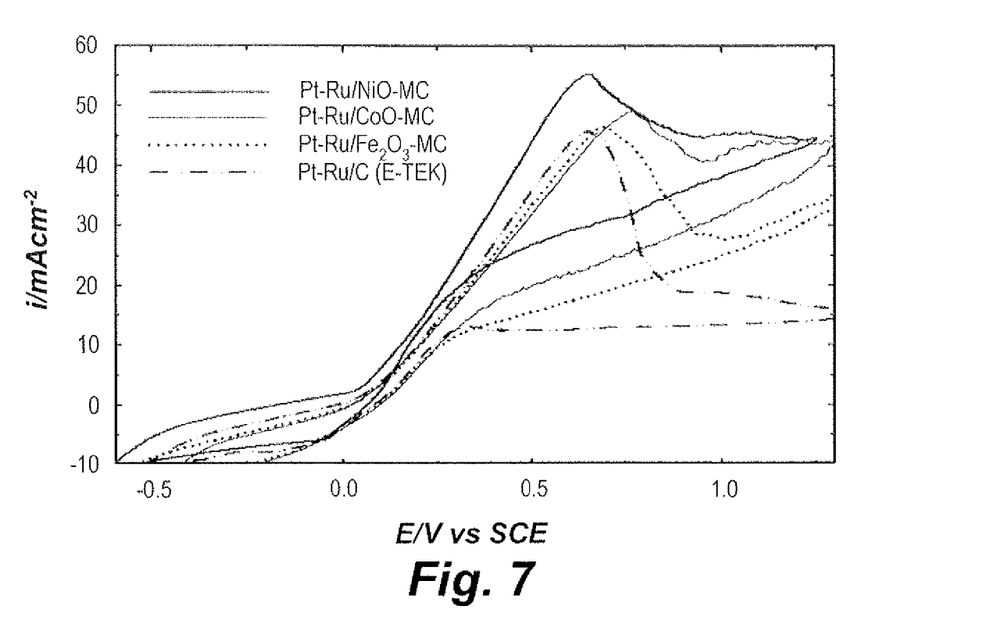
FIG. 7 is a graph showing cyclic voltammetry curves for the methanol electro-oxidation activities of the Pt—Ru/Fe$_2$O$_3$-MC, Pt—Ru/CoO-MC and Pt—Ru/NiO-MC samples compared with a conventional commercial Pt—Ru/C catalyst sample.

The activity of the prepared catalyst samples for methanol electro-oxidation was measured using a beaker-type electrochemical cell. As shown in FIG. 7, cyclic voltammetry curves were obtained for the methanol electro-oxidation activity for the prepared catalyst samples and commercial Pt—Ru/C (E-TEK) measured in $N_2$ purged 1M $H_2SO_4$+2M $CH_3OH$ solution. The anodic peaks for methanol electro-oxidation are clearly observed for all the catalyst samples between 0.62-0.69 V. As shown in Table 4 below, all of the prepared catalyst samples showed higher activity compared to the commercial sample of Pt—Ru/C (E-TEK). Additionally, the catalyst samples showed lower onset potential for methanol electro-oxidation than the commercial Pt—Ru/C (E-TEK). This indicates that NiO, CoO and $Fe_2O_3$ play a positive role in enhancing the methanol electro-oxidation reaction. The improved catalytic activity of the prepared catalyst systems may be attributed to the type of support material used (i.e., mesoporous carbon), use of additional metal nano-oxides and the present catalyst preparation method. The prepared catalyst systems have potential to be used in the anode of a direct methanol fuel cell.

TABLE 4

Cyclic Voltammetry Results for Catalyst Samples and E-TEK

| Catalyst Sample | Peak Position V vs. SCE | Current Density (mA/$cm^{-2}$) | Mass Activity (mA/mg) |
|---|---|---|---|
| Pt—Ru/NiO-MC | 0.65 | 55 | 12.36 |
| Pt—Ru/CoO-MC | 0.74 | 49 | 11.01 |
| Pt—Ru/$Fe_2O_3$-MC | 0.69 | 47 | 10.56 |
| Pt—Ru/C (E-TEK) | 0.66 | 45 | 10.11 |

Figure 8:
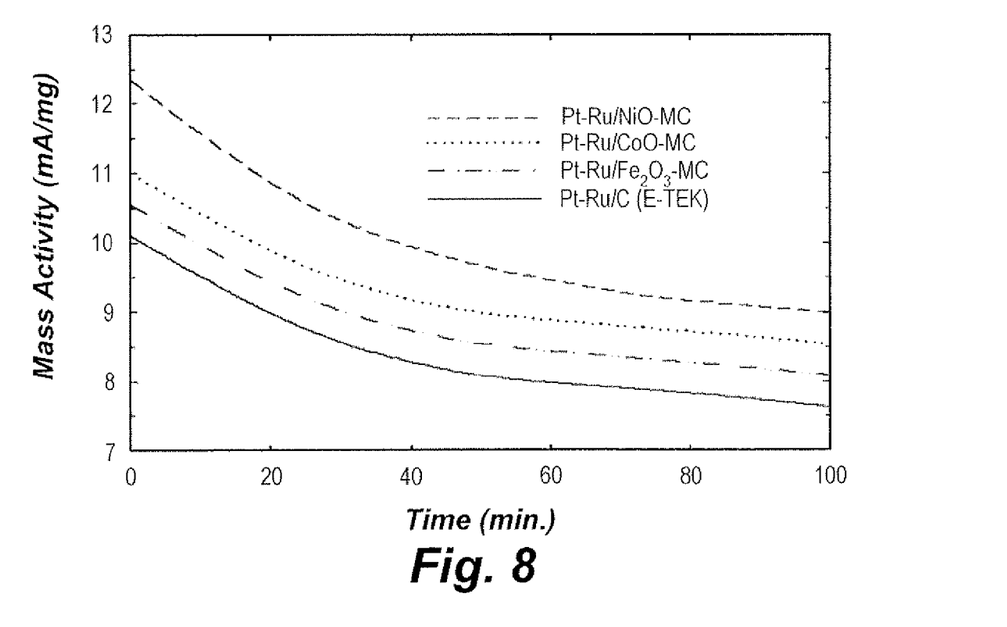
FIG. 8 is a graph showing mass activities as a function of time for the Pt—Ru/Fe$_2$O$_3$-MC, Pt—Ru/CoO-MC and Pt—Ru/NiO-MC samples compared with a conventional commercial Pt—Ru/C catalyst sample.

A preliminary stability test was conducted for all of the catalyst samples, as shown in FIG. 9. The catalysts' mass activity decreased by 27.3%, 22.4%, 23.4%/© and 24.4%, respectively, from its initial value for the Pt—Ru/NiO-MC, Pt—Ru/CoO-MC, Pt—Ru/$Fe_2O_3$-MC, and the commercial Pt—Ru/C, respectively. In general, a gradual decrease in catalytic activity is observed. This indicates that the prepared catalysts have reasonable tolerance to the adsorbed carbon monoxide and other intermediate organic compounds produced during the reaction. However, the catalytic activity for the Pt—Ru/NiO-MC catalyst sample decreased relatively faster than the other catalyst samples. This may be attributed to its high activity, which leads to rapid production of the intermediates, such as the $CO_{ads}$ during the methanol electro-oxidation.

If the rate at which the undesired intermediates are removed is sluggish compared with that of methanol electro-oxidation, then a fast deterioration in the catalyst activity will take place. Additionally, among the prepared catalysts, the Pt—Ru/NiO-MC has the least difference between the pore diameter of the NiO-MC and the Pt—Ru average particle size. This implies that during the methanol electro-oxidation reaction, methanol and intermediate species molecules will have limited pore space, which contributes to causing partial or complete blockage of the pores. Overall, all of the prepared catalyst samples showed a reasonable stability for the methanol electro-oxidation.

The above prepared ternary catalysts can be used for the methanol electro-oxidation reaction. As shown in Table 4 above, an about 18% increase in catalytic activity was achieved by the Pt—Ru/NiO-MC sample compared with the E-TEK commercial catalyst (Pt—Ru/C). The improved catalytic activity and reduction in the amount of noble metal content is expected to enhance the methanol electro-oxidation reaction and lower the overall catalyst cost, which can significantly contribute to overall cost reduction of direct methanol fuel cell production.

It is to be understood that the present invention is not limited to the embodiments described above, but encompasses any and all embodiments within the scope of the following claims.

We claim:

1. A method of making a methanol electro-oxidation catalyst, comprising the steps of:
    adding SBA-15 mesoporous silica to a 0.5M transition metal nitrate solution in ethanol to form an intermediate solution;
    evaporating the intermediate solution to obtain a dry powder;
    oxidizing the dry powder to form a composition of an oxide of a transition metal and SBA-15 mesoporous silica
    adding a sucrose and sulfuric acid solution to the composition to form a slurry;
    drying the slurry to form a secondary dry powder;
    carbonizing the secondary dry powder to form a composition of an oxide of a transition metal and mesoporous carbon;
    performing $NaBH_4$ reduction on the composition of an oxide of a transition metal and mesoporous carbon;
    adding platinum and ruthenium precursors to the transition metal oxide/mesoporous carbon composition to form a secondary slurry; and
    drying the secondary slurry to form the methanol electro-oxidation catalyst.

2. The method of making a methanol electro-oxidation catalyst as recited in claim 1, wherein the 0.5M transition metal nitrate solution is selected from the group consisting of a 0.5M iron (III) nitrate enneahydrate solution in ethanol, a 0.5M cobalt (II) nitrate hexahydrate solution in ethanol, and a 0.5M nickel (II) nitrate hexahydrate solution in ethanol.

3. The method of making a methanol electro-oxidation catalyst as recited in claim 1, further comprising the step of stirring the intermediate solution for about 24 hours at room temperature prior to the step of evaporating the intermediate solution.

4. The method of making a methanol electro-oxidation catalyst as recited in claim 1, wherein the step of oxidizing the dry powder comprises heating the dry powder at about 300° C. for about 3 hours under an oxygen atmosphere.

5. The method of making a methanol electro-oxidation catalyst as recited in claim 1, wherein the step of drying the slurry to form a secondary dry powder comprises the steps of:
    drying the slurry in an oven at a temperature of about 160° C.; and
    crushing the dried slurry to produce the secondary dried powder.

6. The method of making a methanol electro-oxidation catalyst as recited in claim 1, further comprising the steps of:
    adding sucrose, water, and sulfuric acid to the secondary dried powder to form a tertiary slurry; and
    drying the tertiary slurry in an oven at a temperature of 160° C.; and
    crushing the dried tertiary slurry.

7. The method of making a methanol electro-oxidation catalyst as recited in claim 1, wherein the step of carbonizing the secondary dry powder to form the composition of an oxide of a transition metal and mesoporous carbon comprises carbonizing the secondary dried powder at about 900° C.

8. The method of making a methanol electro-oxidation catalyst as recited in claim 1, further comprising the steps of:
    treating the carbonized secondary dried powder with hydrofluoric acid solution;
    filtering the treated carbonized secondary dried powder;
    washing the filtered and treated carbonized secondary dried powder with ethanol; and
    drying the washed carbonized secondary dried powder.

9. The method of making a methanol electro-oxidation catalyst as recited in claim 1, wherein the step of adding the platinum and ruthenium precursors to form the secondary slurry comprises adding hydrogen hexachloroplatinate (IV) hexahydrate and ruthenium (III) nitrosyl nitrate solution (Ru$(NO)(NO_3)_x(OH)_y$) to the transition metal oxide/mesoporous carbon composition.

10. The method of making a methanol electro-oxidation catalyst as recited in claim 1, further comprising the steps of:
    stirring the secondary slurry for about 24 hours at room temperature;
    filtering the secondary slurry; and
    washing the secondary slurry with deionized water.

11. The method of making a methanol electro-oxidation catalyst as recited in claim 1, wherein the step of drying the secondary slurry comprises drying the secondary slurry in a vacuum oven at about 100° C. for about 6 hours.

* * * * *